R. HOFFMAN.
LIGHTING RING.
APPLICATION FILED MAY 26, 1919.

1,367,392.

Patented Feb. 1, 1921.

Witnesses:
W. F. Kilroy
Harry R. L. White

Inventor:
Rudolph Hoffman.
By Miller Chindahl Parker
Attys.

UNITED STATES PATENT OFFICE.

RUDOLPH HOFFMAN, OF KANKAKEE, ILLINOIS, ASSIGNOR TO SEARS, ROEBUCK AND COMPANY, OF CHICAGO, ILLINOIS, A CORPORATION OF NEW YORK.

LIGHTING-RING.

1,367,392.   Specification of Letters Patent.   Patented Feb. 1, 1921.

Application filed May 26, 1919. Serial No. 299,777.

*To all whom it may concern:*

Be it known that I, RUDOLPH HOFFMAN, a citizen of the United States, residing at Kankakee, in the county of Kankakee and State of Illinois, have invented certain new and useful Improvements in Lighting-Rings, of which the following is a specification.

This invention relates to the lighting rings used in wickless oil burners, as, for example, burners of the type shown in Patent No. 1,154,637, dated September 28, 1915, and consisting of a plurality of layers of noncombustible material, such as asbestos, secured together.

The object of this invention is to produce a lighting ring of the character indicated in which the devices for securing the layers of the ring together are arranged in such a manner as to prevent an excessive amount of vapor from passing upwardly between the layers; so as to cause the vapor rising from the ring in use to rise uniformly throughout the circumference of the ring; and so that the fastening devices shall not weaken the ring.

The means for thus securing the layers of the ring together may consist of a plurality of stitches or staples which are inserted near the top of the ring and clenched on the inner side of the ring. These staples are arranged in series around the ring in such a manner that the opposite ends of each staple lie in substantially the same vertical planes as the ends of adjoining staples, the staples being preferably inclined at an angle to the vertical. It will be seen that by this arrangement of the staples the ring is not weakened, as it would be if the staples were arranged end to end around the ring.

Figure 1:
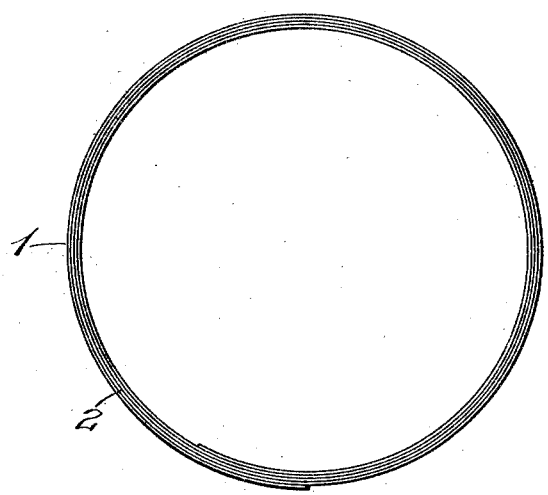
Figure 2:
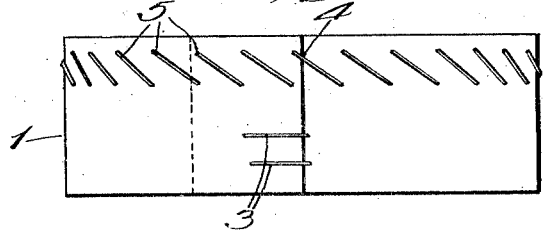
Figure 3:
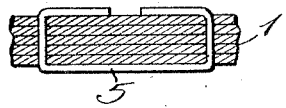

In the accompanying drawings, Figure 1 is a top plan view of a lighting ring embodying the features of my invention. Fig. 2 is a side view. Fig. 3 is a vertical sectional view and illustrates one of the securing means used in my invention.

The lighting ring 1 may be of any suitable material. Herein it is shown as formed of concentric layers of asbestos paper 2, having overlapping ends secured together as by means of wire staples 3 and 4 passed through said overlapping ends. The staples 5 are inserted preferably near the top of the ring and in such a manner that the opposite ends of each staple are spaced from the ends of adjoining staples, but in the same vertical plane. Thus the layers of the ring are securely held together at all points throughout its circumference so that vapor is prevented from rising between the layers and the oil is caused to rise uniformly.

It will be seen that by the use of staples, arranged in the before-mentioned manner, I provide a lighting ring which is not weakened by said staples, and which possesses a periphery tightly secured at all points. The ring is simple yet very strong and durable. Also the manufacturing costs are cut down without producing an inferior ring.

I claim as my invention:

1. A lighting ring for wickless oil burners comprising a body in ring form consisting of a plurality of concentric layers of sheet material, and staples securing said layers together, said staples being inclined relative to each other and arranged in series around the periphery of the ring so that the upper end of one staple will be in the same vertical plane as the lower end of an adjacent staple.

2. In a lighting ring for wickless oil burners comprising concentric layers of noncombustible fibrous material, a plurality of binding staples uniting said layers and regularly spaced about said ring with their opposite ends traversing said layers in two lines spaced substantially apart and parallel to the top of said ring, said staples being inclined so that the adjacent ends of proximate staples lie substantially in the same vertical line.

3. In a lighting ring for wickless oil burners formed of a fibrous material such as asbestos, a series of staples arranged circumferentially of the ring and with their legs extending through the ring at points spaced a substantial distance apart so as to avoid a weakening of the ring, but with their yokes lying against the periphery of the ring relatively disposed in inclined parallel relation so as to permit of uniform capillary action throughout the circumference of the ring.

In testimony whereof, I have hereunto set my hand.

RUDOLPH HOFFMAN.